Feb. 19, 1935.   L. O. BIRD   1,991,781
POWER CONTROL LIFTING, TILTING, AND LOWERING MECHANISM
Filed Oct. 30, 1931
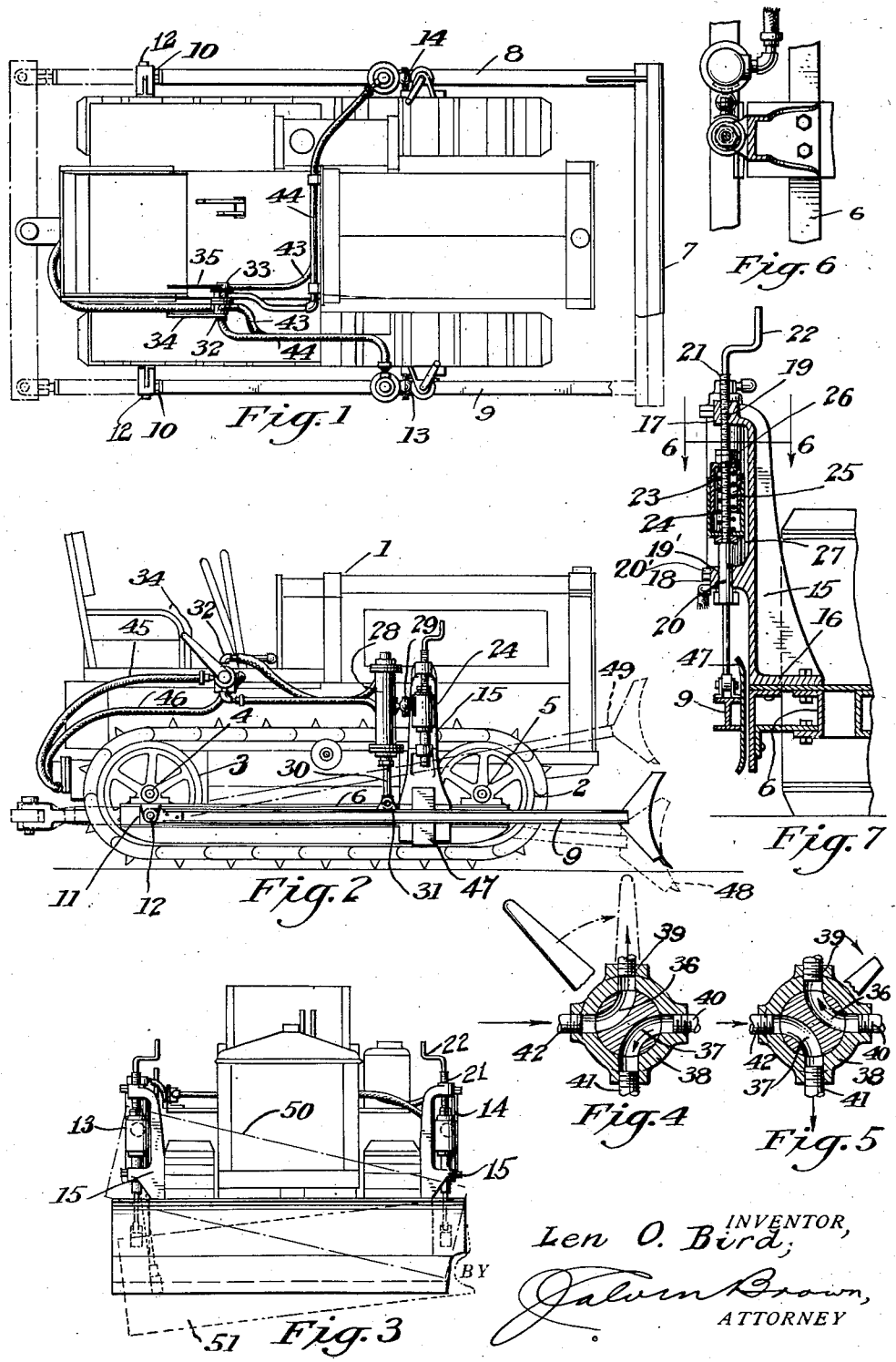

Patented Feb. 19, 1935

1,991,781

UNITED STATES PATENT OFFICE 1,991,781

POWER CONTROL LIFTING, TILTING, AND LOWERING MECHANISM

Len O. Bird, Glendale, Calif., assignor to W. L. Adams, Rexburg, Idaho

Application October 30, 1931, Serial No. 572,044

8 Claims. (Cl. 37—144)

This invention relates to new and useful improvements in mechanism for controlling the raising and the lowering and tilting of the blade and side pusher members of material handling implements, such as bulldozers, snow plows, back fillers, road surfacers, and the like.

An object of the present invention is the simplification of the lifting, lowering and tilting mechanism for the pusher members, and which said mechanism may be secured to any type of tractor.

Another object is the provision of lifting and lowering mechanism which may be added to the tractor without imposing additional unnecessary weight thereon.

Another object is the provision of lifting and controlling mechanism adapted to be mounted upon a tractor, and which said mechanism is adapted to be so mounted to the tractor that breakage of the tractor due to said mechanism is not likely to occur.

In this regard, it will be readily understood that material handling implements secured to a tractor impose considerable stress upon the tractor, particularly when said implements are tipped to various positions in their engagement with work. By way of example, when work is to be moved forward of the tractor through the medium of the material handling implement, considerable strain is imposed upon the side pusher members, the force of which is directly communicated to the mounting between said side pusher members and the tractor. An object of the present invention is to provide a structure wherein shock and strain on the tractor is minimized.

Another object of the invention is the provision of lifting, lowering and tilting mechanism which is efficient in operation, low in cost of manufacture, and generally superior to mechanism for performing a lifting, lowering and tilting operation now utilized with tractors, so far as the inventor is aware.

With the above and other objects in view, the invention consists in the novel and useful provision, formation, construction, association, and relative arrangement of parts, members, and features, all as shown in a certain embodiment in the accompanying drawing, described generally, and more particularly pointed out in the claims.

In the drawing:

Figure 1 is a plan view of a tractor incorporating the improved lifting and lowering mechanism for material handling implements, Figure 2 is a side elevation of the tractor showing the improved lifting and lowering mechanism secured thereto, Figure 3 is a front elevation of the tractor and the mechanism of the invention, Figure 4 is a sectional view of a valve mechanism which may be used in practicing the invention, Figure 5 is a further transverse sectional view of the valve mechanism shown in the second position, Figure 6 is a sectional view on the line 6—6 of Figure 7, and, Figure 7 illustrates in vertical section certain mechanism for mounting the lifting and lowering mechanism to the tractor.

Referring to the drawing, I have shown the conventional form of tractor at 1. As is usual, this tractor is provided on both sides with front and rear pairs of tractor wheels 2 and 3, respectively, which said wheels are mounted on front and rear axles 4 and 5, respectively. The front wheels are usually the driven wheels and the axle 4 is ordinarily termed the "dead" axle. These said axles are carried in suitable bearing blocks fastened to tractor side frame members 6.

The earth moving implement includes a blade 7 positioned forwardly of the front end of the tractor, with said blade secured to ends of a pair of substantially spaced-apart pusher arms 8 and 9, one for each side of the tractor, and with said pusher arms having their opposite ends 10 secured to bearing plates 11, the said bearing plates being swingingly mounted upon suitable trunnions 12 secured to the side frame members 6 of the tractor. This construction affords a relatively long leverage for the blade. Means 13 and 14 are provided for elevating and lowering the said pusher arms. The means are so constituted that they may be individually controlled as to movement to thereby cause the blade to assume various angularities during engagement of the blade with work. Said means 13 and 14 are identical in construction and, therefore, one of said means will be described. This said means includes a bracket 15 secured to the framing 6, as shown at 16 in Figure 7, and this said bracket has a pair of spaced-apart outstanding projections 17 and 18. Both projections are provided with aligned bores 19, the bore 19 of the projection 17 being internally screw-threaded. A sleeve 20 is locked in any adjusted position within the bore 19' of projection 18 by a bolt 20'. Adapted to extend between said projections and through the said sleeve 20 and in screw-threaded engagement with the threads 19 of projection 17 is a screw-threaded shaft 21, which shaft carries a bell crank lever at one end to facilitate rotation thereof. A pair of telescopic cylinders 23 and 24 are upon said shaft and interposed between the projections 17 and 18. Surrounding the shaft and enclosed by the said cylinders is a coil spring 25. Tension of the spring between the said cylinders is regulated by nuts 26 and 27 carried on the screw-threads of the shaft. Ordinary locking means may be provided for locking the nut 26 during rotation of the shaft.

Adjacent the telescoping cylinders is a hydraulic cylinder 28 and a ball and socket mounting 29 secures said cylinder 28 to the cylinder 24. A piston is within the said cylinder 28 and a piston arm 30 thereof is pivotally secured to member 31 carried by the pusher arm.

In order to control movement of the piston within the cylinder 28, I have provided a pair of valve means. There is a separate valve for each cylinder, as shown at 32 and 33, and independent levers 34 and 35 control operation of said valves. The valves are of the four-way type, as illustrated in Figures 4 and 5. Each valve is identical in construction and one thereof will be described. The valve plug is provided with two independent curved ports 36 and 37, and the valve housing 38 has four ports 39, 40, 41, and 42. The valve plug may obviously be revolved by one or the other levers 34 or 35, depending on which valve is to be controlled, to the end that the plug will have the port 36 communicating with the ports 39 and 42 and the port 37 with the ports 40 and 41, or the port 37 may be in communication with the ports 41 and 42, and the port 36 in communication with the ports 39 and 40, or the said ports 36 and 37 may be positioned so as to be closed within the housing. Flexible conduits 43 and 44 lead to the bottom and top of each cylinder and communicate with the ports 41 and 39 of each respective valve. The inlet and outlet ports 40 and 42 of both valves communicate with return and inlet conduits 45 and 46, which conduits communicate with a pump for supplying fluid under pressure to the inlet line.

Carried by both pusher arms are rub plates 47 and which rub plates are adjacent the brackets and tractor framing, as best shown in Figure 7.

The operation, uses and advantages of the invention just described are as follows:

As shown, the pusher arms for the blade are fulcrumed adjacent the dead axle of the tractor, although the fulcrum point may be rearward of the tractor without in any manner affecting the invention. If it is desired to raise or lower the pusher arms, the operator of the tractor may engage both of, or one or the other of, the valve arms 34, 35 to simultaneously pump fluid under pressure above the pistons in the cylinders 28, which will cause the piston arms to extend outwardly from the cylinders and force the pusher arms downwardly to say the dotted line position shown in Figure 2 at 48. By again operating the valves, the pusher arms may be moved to the dotted line position shown at 49, with the blade elevated. The blade may be readily tipped to the dotted line positions shown at 50 and 51 of Figure 3 by simply controlling one of the valves. The ball and socket connection between the cylinders 24 and 28 allows for a rocking movement of the cylinder 28 during movement of a pusher arm. When irregularities of the surface are contacted, shock which would otherwise be directly communicated to the tractor frame by the pusher arms is communicated to one or the other or both cylinders 28, and in turn communicated to the cylinder 24. However, the cylinder 24 constitutes one of two telescoping cylinders between which is a coil spring 25, with the result that the shock is absorbed by the spring. Thus, appreciable road shock is absorbed by the springs 25 for both sides of the tractor and without imposing undue strain upon the tractor frame itself. The position of the cylinders is readily regulated by merely turning the shaft 21 which, of course, moves the telescoping cylinders 23 and 24, and hence the cylinder 28.

Quick movement of the pusher arms is afforded by the mechanism just described. Furthermore, as the tractor moves over the surface of the ground, the operator can readily regulate the pusher arms to position the blade so as to allow the tractor to respond to surface irregularities without affecting the position of the blade in its engagement with work. If the tractor is operating on the side of a hill, the blade may be maintained at an angle relative to the tractor, to-wit, a level position by mere control of the fluid admitted to the cylinders, or control may likewise be afforded by the screw adjustment utilized for raising and lowering the cylinders. The method of controlling the angularity of the pusher blade as well as the elevation and lowering of said blade is simple and efficient and does not impose a great deal of extra dead weight upon the tractor. Most devices adapted for performing the function of raising and lowering the blade involve many complicated parts, such as shafts, rocking arms, various bell crank levers, and the like, which while undoubtedly performing the function required thereof in an efficient manner yet add very materially to the weight of the tractor and provide many extra members adapted to get out of order or subject to breakage. My invention is simple in that I provide the pusher arms carrying the blade, and simple hydraulic means or any other equivalent lifting and lowering means adapted to be controlled from the driver's seat for raising and lowering the arms directly and not through other members, such as those just enumerated. In addition, I provide suitable means for absorbing shock communicated to the hydraulic cylinders or to the lifting and lowering means, in combination with means for adjusting said aforesaid means.

It is obvious that various changes and modifications may be made in practicing the invention in departure from the particular showing of the drawing without departing from the true spirit of the invention.

I claim:

1. The combination with a vehicle, of a pair of pusher arms swingingly mounted upon said vehicle, and a material handling implement extending between said pusher arms and forward of the vehicle, a valve controlled hydraulic piston secured to one of said pusher arms between the material handling implement and the mounting of said pusher arm with the vehicle, and adjustable means carried by the vehicle and resiliently supporting said valve controlled hydraulic piston.

2. The combination with a tractor having the usual wheeled supports, the tractor frame, of a pair of pusher arms swingingly mounted on said tractor, a material handling implement secured between said pusher arms and forward of the tractor, a bracket for each side of said tractor and secured to the frame thereof, resilient means carried by both brackets, and hydraulic controlled means rockably secured to said resilient means and to said pusher arms.

3. The combination with a tractor having the usual wheeled supports and tractor frame, of a pair of pusher arms mounted on said tractor frame, a material handling implement secured at an end of said pusher arms and forward of the tractor, a bracket for each side of said tractor and secured to the frame thereof, resilient means carried by both brackets, hydraulic controlled means secured to said resilient means and to said pusher arms to tilt the material handling implement transversely of the tractor, and means for admitting a pressure to said hydraulic controlled means to tilt the pusher arms.

4. In a device of the character disclosed, a bracket, a screw shaft carried thereby, a pair of telescoping cylinders on said shaft, a compression spring between said cylinders, and means on said shaft and engaging said cylinders, whereby rotation of said shaft positions the said cylinders relative to the said bracket.

5. In a device of the character disclosed, a pair of spaced apart pusher arms carrying at one end a material handling implement, means for swingingly mounting said pusher arms at the opposite ends thereof to a carrying vehicle, and hydraulic power means including a piston and a cylinder for each pusher arm positioned between ends thereof, one member being connected to a pusher arm and the other member to the vehicle for positively raising and lowering and tilting the said pusher arms simultaneously and independently.

6. In a device of the character disclosed, a pair of spaced-apart pusher arms, a blade carried between said pusher arms, means for rockably mounting said pusher arms to a carrying vehicle, power means including a piston and a cylinder, one member of which is secured to a pusher arm and the other member of which is secured to the vehicle, whereby when said power means is operated the said pusher arms are positively raised and lowered, and a shock absorbing mounting between each cylinder and the vehicle.

7. The combination, in a tractor provided with a tracklayer frame, of a pair of pusher arms both independently swingingly mounted at one end to a side of said frame, a material handling implement secured at forward ends of the pusher arms, a bracket mounted on each tracklayer frame and positioned between ends of the pusher arms, and valve-controlled hydraulic cylinders and pistons, the cylinders of which are mounted on said brackets and said piston members being directly connected with said pusher arms for positive control of said pusher arms to raise, lower and tilt the same simultaneously or independently.

8. The combination, in a tractor provided with a tracklayer frame and a draw bar, of a material handling implement disposed forwardly of said tractor frame, pusher arms secured to said material handling implement and swingingly secured to the draw bar, brackets mounted on the tracklayer frame of said tractor, manually adjustable means carried by the brackets, valve-controlled hydraulic cylinders secured to the manually adjustable means, and piston members for said hydraulic cylinders, said pistons being directly connected to the pusher arms for positively controlling movement thereof.

LEN O. BIRD.